United States Patent [19]
Kim et al.

[11] Patent Number: 5,646,554
[45] Date of Patent: Jul. 8, 1997

[54] METHOD AND APPARATUS FOR SELECTIVE CLOCKING USING A MULLER-C ELEMENT

[75] Inventors: Seokjin Kim, Amherst; Ramalingam Sridhar, East Amherst, both of N.Y.

[73] Assignee: Research Foundation of State University of New York, Albany, N.Y.

[21] Appl. No.: 406,316

[22] Filed: Mar. 16, 1995

[51] Int. Cl.$^6$ ................................................. H03K 19/096
[52] U.S. Cl. ................................. 326/93; 326/98; 327/141
[58] Field of Search ........................ 326/93–94, 98; 327/141–142, 155

[56] References Cited

U.S. PATENT DOCUMENTS

| | | | |
|---|---|---|---|
| 4,458,308 | 7/1984 | Holtey et al. | 364/200 |
| 4,636,656 | 1/1987 | Snowden et al. | 307/267 |
| 4,949,360 | 8/1990 | Martin | 326/93 X |
| 5,059,834 | 10/1991 | Tago et al. | 326/93 X |
| 5,167,024 | 11/1992 | Smith et al. | 395/375 |
| 5,172,010 | 12/1992 | Montegari | 307/265 |
| 5,192,914 | 3/1993 | Sudo et al. | 328/72 |
| 5,235,600 | 8/1993 | Edwards | 371/22.3 |
| 5,289,050 | 2/1994 | Ogasawara | 307/269 |
| 5,321,368 | 6/1994 | Hoelzle | 326/93 X |
| 5,387,825 | 2/1995 | Cantrell et al. | 326/93 X |

OTHER PUBLICATIONS

Mead, C. and Conway, L., "Introduction to VLSI Systems," System Timing, pp. 254–255. Oct. 1980.

Burns, S.M., "Performance Analysis and Optimization of Asynchronous Circuits," Doctoral Thesis, California Institute of Technology, Dec. 1991, pp. 46–49.

Afghahi, M. and Svensson, C., "Performance of Synchronous and Asynchronous Schemes for VLSI Systems," IEEE Transactions on Computers, vol. 41, pp. 858–872, 1992, (15 pages).

van Berkel, K., "Beware the Isochronic Fork," Integration, the VLSI Journal, vol. 13, 1992, pp. 103–128.

Stucki, M.J. and Cox, Jr., J.R., "Synchronization Strategies," Caltech Conference on VLSI, Jan. 1979, (18 pages).

Aluetta, et al., "A Comparison of Synchronous and Asynchronous FSMD Designs," IEEE International Conference on Computer Design, 1993, pp. 178–182.

Chandrakasan, et al., "Low–Power CMOS Digital Design," IEEE Journal of Solid State Circuits, 1992, pp. 473–483.

Salomon and Klar, "Self–Timed Fully Pipelined Multipliers," Asynchronous Design Methodologies, vol. A–28 of IFIP Transactions, 1993, pp. 45–55.

Traver, C., "A Testable Model For Stoppable Clock Asics," Proceedings of the 1991 IEEE ASIC Conference, pp. 23–27, IEEE, Sep., 1991.

Seitz, C., "Self–Timed VLSI Systems," Caltech Conference on VLSI, Jan. 1979, (11 pages).

Sutherland, I., "Micropipelines," Communications of the ACM, vol. 32, No. 6, Jun. 1989, pp. 720–738.

Primary Examiner—David R. Hudspeth
Attorney, Agent, or Firm—Heslin & Rothenberg, P.C.

[57] ABSTRACT

The invention relates to the design and operation of local clock control circuits which operate to supply a local clock signal to a controlled block of a digital circuit in response to an enable signal representative of an enable condition. The invention is embodied in several alternative local clock control circuits which comprise a signal joining means or a signal joining means in combination with an enable signal relay means. The signal joining characteristics of the Muller C-element are used advantageously in several embodiments. The invention serves to ease constraints on the arrival time of an enable signal at the local clock control circuit.

20 Claims, 10 Drawing Sheets

METHOD AND APPARATUS FOR SELECTIVE CLOCKING USING A MULLER-C ELEMENT

BACKGROUND OF THE INVENTION

Digital electronic systems may operate as cooperative systems of distinct controlled blocks. These controlled blocks may operate under the direction of controlling blocks, which continually assess whether particular controlled blocks are necessary to the operations being performed by the system and selectively enabling the operation of those controlled blocks accordingly. Selective clocking is a method for enabling and disabling the operation of a controlled block by selectively enabling and disabling a clock signal provided to the controlled block.

SUMMARY OF THE INVENTION

The invention relates to the design and operation of local clock control circuits which operate to supply a local clock signal to a controlled block of a digital circuit in response to an enable signal representative of an enable condition. The invention is embodied in several alternative local clock control circuits which comprise a signal joining means or a signal joining means in combination with an enable signal relay means. The signal joining characteristics of the Muller C-element are used advantageously in several embodiments. The invention serves to ease constraints on the arrival time of an enable signal at the local clock control circuit.

DESCRIPTION OF DRAWINGS

Several of the drawings which are described below illustrate the logic of various embodiments of the invention. The various components which may be used to implement these embodiments and their equivalents will be obvious to those of ordinary skill in the art.

DETAILED DESCRIPTION OF INVENTION

Figure 1:
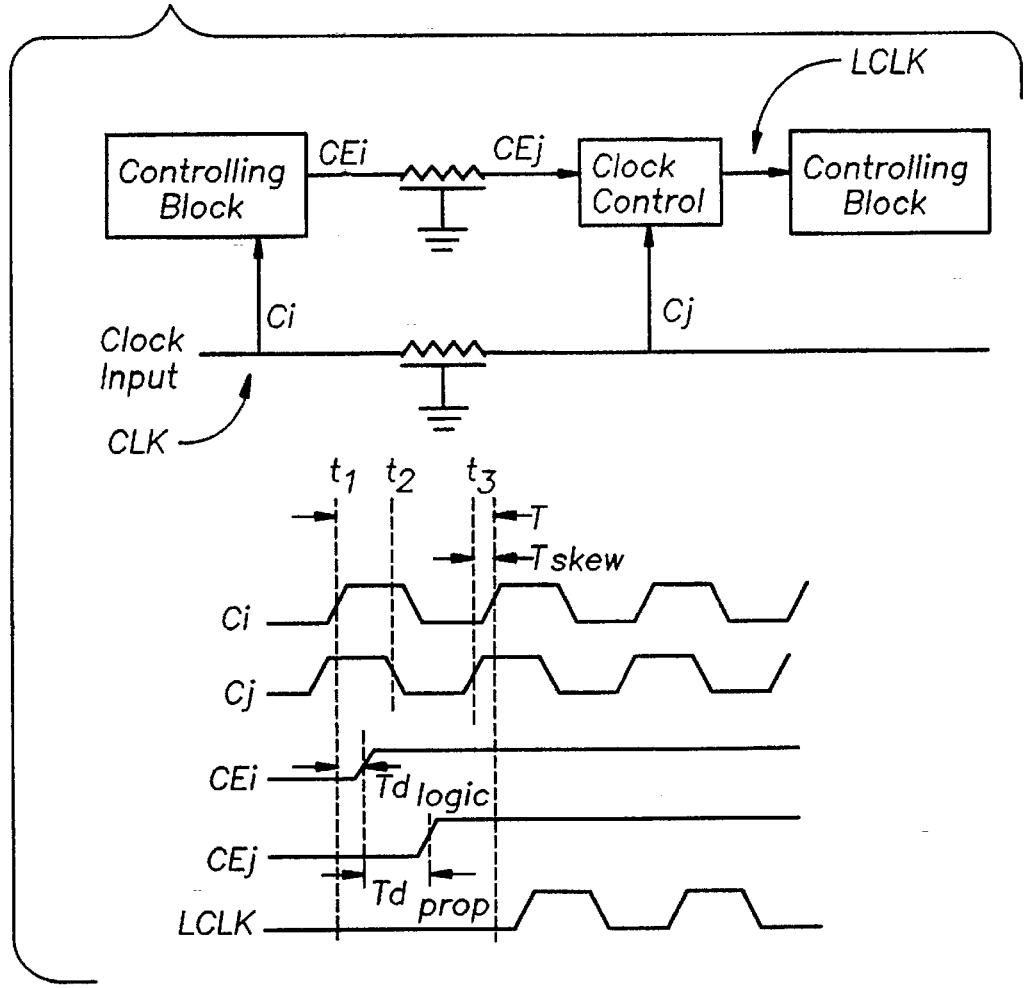
FIG. 1: A generic diagram of a digital circuit which uses selective clocking in accordance with the invention, and its timing diagram.

I Introduction: Selective clocking and operation of local clock control circuits in accordance with the invention The invention relates to the design and operation of local clock control circuits which operate to supply a local clock signal to a controlled block of a digital circuit which employs selective clocking. In digital circuits which incorporate selective clocking in accordance with the present invention, a source clock signal CLK is utilized as the source of clock pulses which are provided to a controlled block as a local clock signal LCLK by means of a local clock control circuit. FIG. 1 provides a generic diagram of a section of a digital circuit employing selective clocking. Upon receiving a clock pulse Ci of a source clock signal CLK by means of a source clock input, a controlling block determines, by means of a control logic circuit, whether the operations being performed by the system require the operation of a corresponding controlled block. The controlling block completes its determination after a control logic delay time $Td_{logic}$. If the controlling block determines that the operations of the system require the operation of the controlled block, an enable condition is indicated, and the controlling block issues an enable signal representative of the enable condition. The enable signal is issued in the form of an enable pulse CEi, and is propagated over an enable line which connects the controlling block to a local clock control circuit. The beginning of the clock enable condition is typically indicated by the rising edge of CEi. After a propagation delay time $Td_{prop}$, the rising edge of the enable pulse CEi arrives at the local clock control circuit as the rising edge of a skewed clock enable pulse CEj, indicating to the local clock control circuit that it must begin to supply a local clock signal LCLK to the controlled block.

The source clock signal CLK provided to the controlling block is contemporaneously propagated over a source clock line which connects the source clock to the local clock control circuit. Individual source clock pulses Ci arrive at the local clock control circuit after a delay time $T_{skew}$ as skewed clock pulses Cj. The local clock control circuit operates to provide a local clock signal LCLK to the controlled block by selectively passing the skewed pulses Cj of the source clock signal CLK to the controlled block when a clock enable condition is indicated by the state of the enable signal CE. If the controlling block operates to determine the disabling of the controlled block, the width of the clock enable pulse CEi will be commensurate with the duration of the period during which the controlled block is to be operated.

II First alternative embodiment

Figure 2:
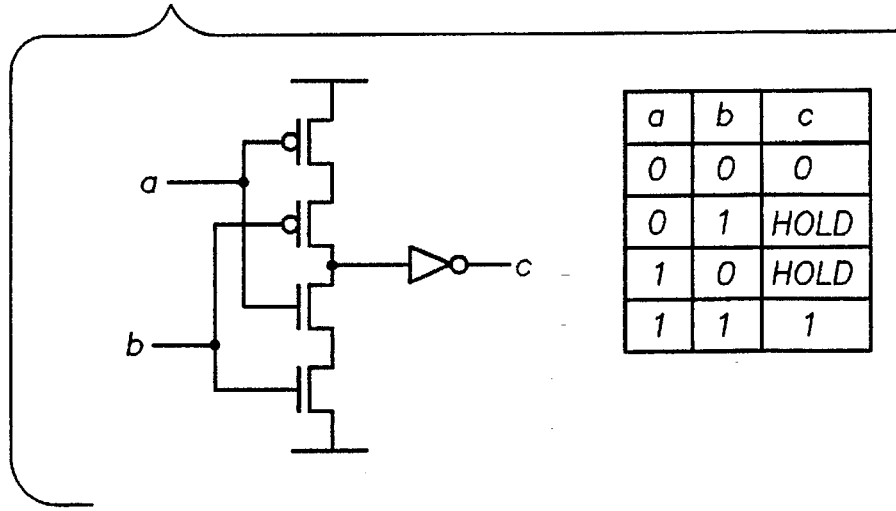
FIG. 2: A CMOS implementation of a dynamic Muller C-element and its truth table.

The first alternative embodiment of the invention employs a two-input Muller C-element. The two-input Muller C-element and its signal joining characteristics are illustrated in FIG. 2. The Muller C-element is a two-state signal joining element. Its output becomes high (1) only upon all inputs being high, and its output becomes low (0) only upon all inputs being low. Ideal behavior is achieved when transmission delays within the element are negligible in comparison to the gate delay, a constraint which is usually achieved in integrated circuit embodiments. The Muller C-element is represented by a circled "C" in FIG. 3 and in the remaining figures, and will be referred to hereinafter as a "C-element."

Figure 3:
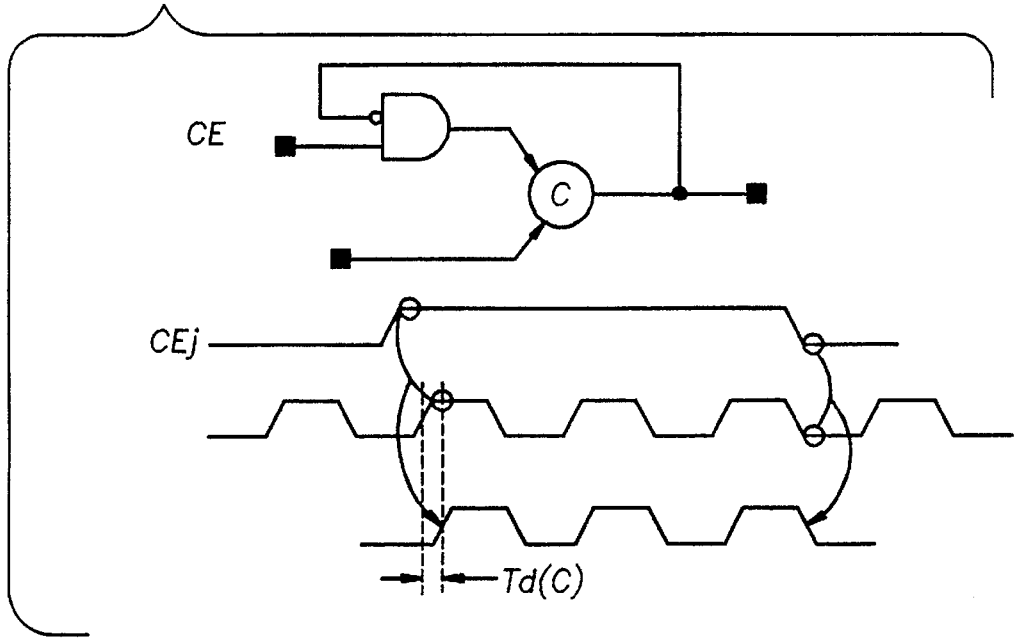
FIG. 3: The logic of a first alternative local clock control circuit embodying the invention, and its timing diagram.

FIG. 3 illustrates the logic of a signal joining means which may be employed in accordance with the invention as a first alternative local clock control circuit. An enable signal CE is received at a first input of a two-input AND gate. This input operates as the enable signal input of the signal joining means. The AND gate receives at its other input the inverted output signal from a C-element. It is assumed for purposes of this description that the C-element illustrated in this circuit is initialized to have 0 at its output. An initialization means as described with respect to the second alternative embodiment described hereinafter may be similarly incorporated into the present embodiment.

The output of the AND gate is coupled directly to a first input of the C-element. This input will be referred to as the enable signal input of the C-element. The C-element receives a source clock signal CLK at its second input. This input will be referred to hereinafter as the source clock input of the signal joining means. The terms "rising edge" and "falling edge" are used herein to refer to those points in the transitions between states of a binary signal at which the amplitude of the signal transcends the threshold value of logical 1 (high) and logical 0 (low), respectively.

When the controlling block determines that the operation of the controlled block is required, the enable signal CE is propagated, and the enable signal input of the signal joining means receives the rising edge of CEj, causing the output of the AND gate to go high. A local clock signal LCLK is thereafter produced at the output of the C-element, beginning with the next immediate instance of high input to the C-element from the source clock signal CLK. If the source clock signal CLK is high at the rising edge of CEj, LCLK will immediately go high and then fall with the next falling edge of the source clock signal CLK. If the source clock signal CLK is low at the rising edge of CEj, LCLK will go high upon the reception of the next rising edge of the source clock signal CLK. LCLK will thus follow the source clock signal CLK, being delayed by an amount equal to the gate delay $T_d(C)$ of the C-element.

If the controlling block further operates to subsequently disable the controlled block, the enable signal CE will go low. The enable input of the signal joining means will receive the falling edge of CEj, and LCLK will be terminated at the next falling edge of the source clock signal CLK. The terminal LCLK pulse will have the same width as its corresponding CLK pulse, irrespective of whether the enable signal CEj goes low during a high phase of the source clock signal CLK.

As stated above, the first pulse of the local clock signal LCLK will be shortened if the rising edge of CEj is received at the enable input of the signal joining means during a high phase of the source clock signal CLK. FIG. 1 illustrates the correlation between the arrival time of the rising edge of an enable signal CEj with respect to a corresponding source clock pulse Cj. The delay between the arrival of the rising edge of a clock pulse Cj and the rising edge of its corresponding enable pulse CEj is a function of the propagation delays within the circuit, and may be expressed in terms of the logic delay $Td_{logic}$ of the controlling block logic, the propagation delay $Td_{prop}$ of the enablement line, and the clock skew $T_{skew}$. Assuming that the clock has a 50% duty cycle, shortening of the first local clock pulse as a result of propagation delays will not occur where:

$$T/2 - dT_{skew} - Td_{logic} < Td_{prop} < T - dT_{skew} - Td_{logic}$$

Systems utilizing this embodiment as a clock control circuit are constrained to designs in which the propagation delay between the controlling block and controlled block falls within this critical range. This limit may be realized as a constraint on the system architectures in which this embodiment may be employed.

The arrival time of CEj may also produce non-ideal behavior of the local clock control circuit in the event of a setup violation. The setup time for the instant embodiment is given as:

$$T_d(inv) + T_d(and)$$

When the rising edge of CEj is received by the signal joining means within a period equalling the setup time prior to the reception of the rising edge of the source clock signal CLK at the signal joining means, the first pulse of the local clock signal LCLK will shortened.

If the falling edge of CEj is received at the signal joining means within a period having the duration of the setup time prior to the reception of the falling edge of the source clock signal CLK at the signal joining means, the termination of the local clock signal LCLK will be delayed until the next falling edge of the source clock signal CLK. As a result, one additional local clock pulse will be provided to the controlled block. Typically, a single local clock pulse subsequent to the termination of the enable condition will not produce a malfunction in the controlled block.

The minimum source clock period for this embodiment is the larger of the minimum clock period $T_{min1}$ of the clock control circuit and the minimum clock period $T_{min2}$ of the controlled block. These are given by:

$$T_{min1} >= T_d(inv) + T_d(and) + T_d(C)$$

and $$T_{min2} >= T_d(logic) + T_{skew}(internal)$$

where $T_d$(logic) is the sum of the gate delays internal to the controlled block and $T_{skew}$(internal) is the maximum local skew inside the controlled block. Typically, the delay associated with the controlled block, rather than the delays of the local clock control circuit, is determinative of the minimum source clock period.

The instant embodiment may be preferable in some applications due to its economy of size. Ideal behavior will be achieved in cases where CEj arrives during the low phase of CLK prior to the setup period before the rising edge of CLK.

III Second alternative embodiment

Figure 4:
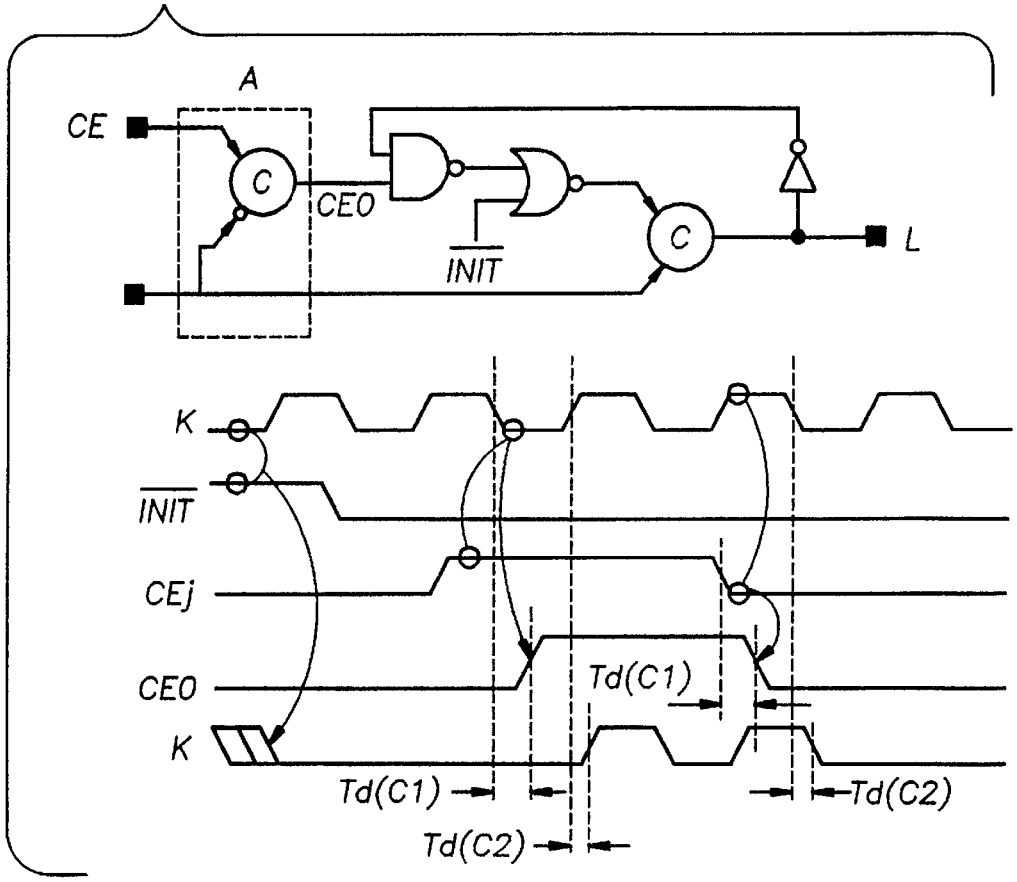
FIG. 4: The logic of a second alternative local clock control circuit embodying the invention, and its timing diagram.

FIG. 4 illustrates a second alternative local clock control circuit comprised of an enable signal relay means, shown in the box marked A, and a signal joining means as illustrated in FIG. 3. The enable signal relay means of this embodiment functions to detect an enable signal representative of an enable condition from a control logic and to convey a secondary enablement signal representative of the enable condition to the signal joining means at such time as the state of the source clock signal CLK being received at the enable signal relay means is low. The term "relay means," in the context of the invention, is intended to refer only to the means described herein and to their functional equivalents.

In this embodiment, the enable signal relay means comprises a C-element which receives an enable signal CEj from a controlling block at its first input and an inverted source clock signal CLK at its second input. It is assumed that the output of this C-element is initialized to 0. Upon the reception of the rising edge of the enable signal CEj, the C-element changes the state of its output, a secondary enable signal CE0, to high if the source clock signal CLK is low, or, if CLK is high, beginning at the reception of the next falling edge of the source clock signal CLK. The secondary enable signal CE0 is provided to the enable input of a signal joining means as previously described and illustrated in FIG. 3. The operation of the enable signal relay means broadens the range of arrival times for CEj which will not result in a shortened initial local clock pulse. The constraint on $Td_{prop}$ is thereby eased.

In the signal joining means illustrated in FIG. 4, the output of the NAND gate is coupled to the enable input of the C-element by means of an initialization means. The initialization means consists of a NOR gate which operates to initialize the signal joining means in response to an initialization signal $\overline{INIT}$ received at a first input. When the source clock signal is low and $\overline{INIT}$ is high, the local clock signal LCLK is initialized to 0 and remains low irrespective of the state of CLK. When $\overline{INIT}$ is thereafter made to go low, the initialization means operates to pass the signal provided to its second input. Such an initialization means may be incorporated at the input of any of the C-elements disclosed herein where the C-element receives a clock signal at its other input. For purposes of this disclosure, the various means by which a signal may be conveyed or an element may be coupled to the non-clock input of such C-elements are intended to include such an initialization means and its equivalents.

A setup time violation will result in non-ideal behavior of this embodiment of the invention. The setup time for the instant embodiment is given by:

$$T_{setup} = T_d(inv) + T_d(C) + T_d(NAND) + T_d(NOR)$$

When the rising edge of CEj is received at the enable signal relay means within a period having the duration of the setup time prior to the reception of the rising edge of the source clock signal CLK at the signal joining means, the first pulse of the local clock signal LCLK will be shortened by an amount equal to the setup time. Constraints on $Td_{prop}$ may therefore be realized as dependant upon the setup time of this circuit.

If the falling edge of CEj is received at the enable signal relay means within a period equalling the setup time prior to the reception of the falling edge of the source clock signal CLK at the signal joining means, the termination of the local clock signal LCLK will be delayed until the next falling edge of the source clock signal CLK. As a result, one additional local clock pulse will be provided to the controlled block.

The minimum source clock period for this embodiment is the larger of the minimum clock period $T_{min1}$ of the clock control circuit and the minimum clock period $T_{min2}$ of the controlled block. These are given by:

$$T_{min1} \geq T_d(inv) + T_d(nand) + T_d(nor) + T_d(C)$$

and $$T_{min2} \geq T_d(logic) + T_{skew}(internal)$$

where $T_d(logic)$ is the sum of the gate delays internal to the controlled block and $T_{skew}(internal)$ is the maximum local skew inside the controlled block. Typically, the delay associated with the controlled block, rather than the delays of the local clock control circuit, is determinative of the minimum source clock period.

IV Third alternative embodiment

Figure 5:
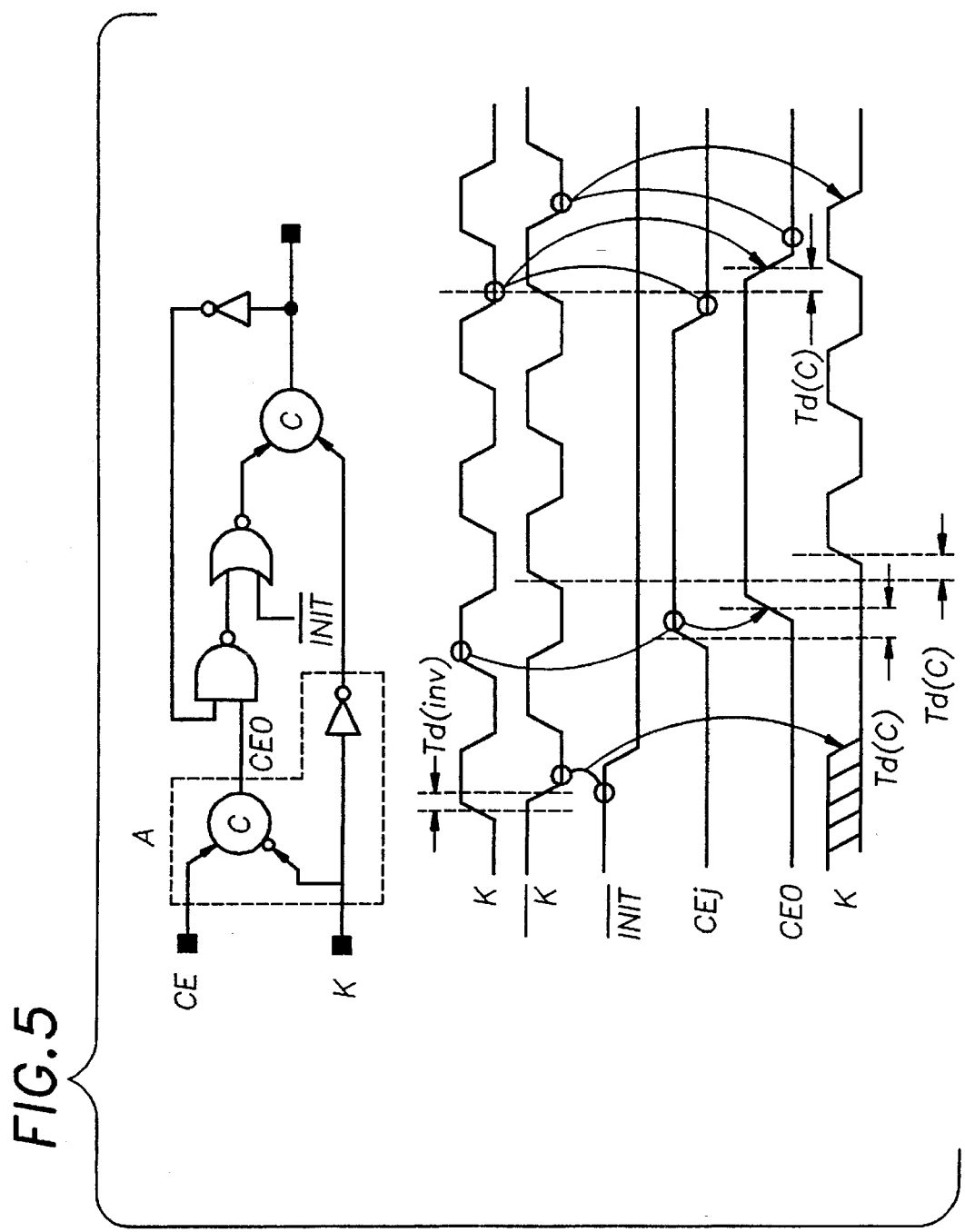
FIG. 5: The logic of a third alternative local clock control circuit embodying the invention, and its timing diagram.

FIG. 5 illustrates a third alternative local clock control circuit comprised of a second alternative enable signal relay means, shown in the box marked A, and a signal joining means as illustrated in FIG. 3. The enable signal relay means of this embodiment functions to detect an enable signal representative of an enable condition, to convey a secondary enable signal to the enable signal input of the signal joining means, and to delay the source clock signal. This embodiment may be viewed as an adaptation of the second alternative embodiment which is preferred for use in systems in which a control enable pulse CE is issued by a controlling block at the falling edge of CLK, or in which an inverted LCLK is required at the controlled block.

In this embodiment, the enable signal relay means comprises a C-element which receives an enable signal CEj from a controlling block at a first input, and a source clock signal CLK at a second input. It is assumed that the output of the C-element is initialized to 0. Upon the registration of the rising edge of the enable signal CEj, the C-element produces a secondary enable signal CE0 if CLK is high. If CLK is low at the registration of the rising edge of CEj, CE0 will be produced beginning at the next rising edge of the source clock signal CLK. The secondary enable signal CE0 is in turn provided, by means of an initializing NOR gate as described above, to the enable signal input of a signal joining means as previously described and illustrated in FIG. 3.

The enable signal relay means further consists of an inverter which provides an inverted clock signal $\overline{CLK}$ to the source clock input of the signal joining means. In functional terms, this inverter operates to produce a half-clock delay in the source clock signal CLK received at the signal joining means.

The inverter additionally introduces a gate delay into the source clock signal CLK which is received by the signal joining means, thereby reducing the setup time of the circuit. The setup time for this embodiment is given as:

$$T_{setup} = T_d(C) + T_d(NAND) + T_d(NOR) - T_d(inv)$$

When the rising edge of CEj is received at the enable signal relay means within a period having the duration of the setup time prior to the reception of the falling edge of the source clock signal CLK at the inverter, the first pulse of the local clock signal LCLK will be shortened by an amount equal to the setup time. Constraints on $Td_{prop}$ may therefore be realized as dependant upon the setup time of this circuit.

If the falling edge of CEj is received at the enable signal relay means within a period equalling the setup time prior to the reception of the rising edge of the source clock signal CLK at the inverter, the termination of the local clock signal LCLK will be delayed until the next falling edge of the source clock signal CLK. As a result, one additional local clock pulse will be provided to the controlled block.

The minimum source clock period is determined in the same manner as with the second alternative embodiment.

V Fourth alternative embodiment

Figure 6:
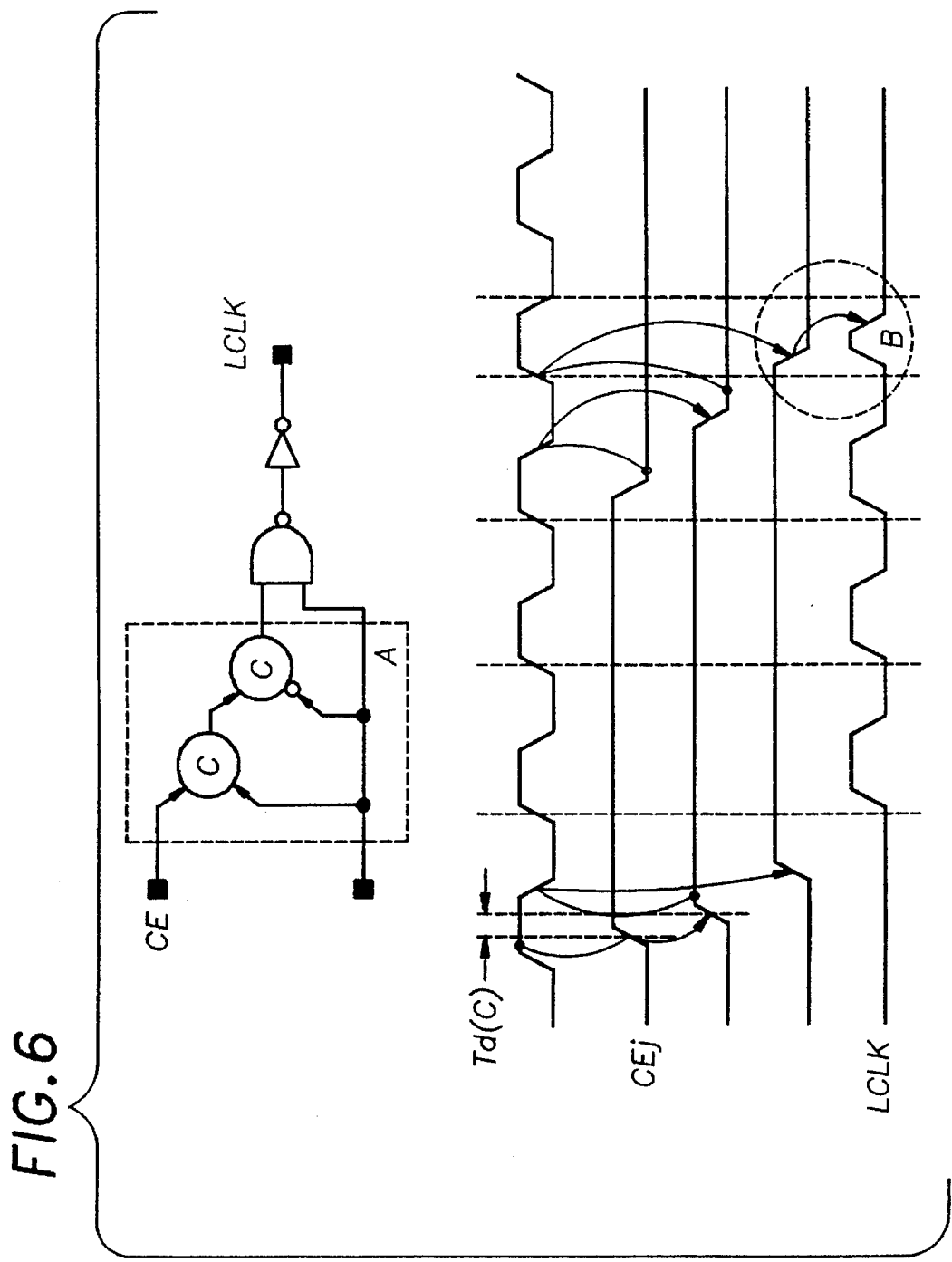
FIG. 6: The logic of a fourth alternative local clock control circuit embodying the invention, and its timing diagram.

FIG. 6 illustrates a fourth alternative local clock control circuit comprising an enable signal relay means and a signal joining means. The signal joining means in this embodiment is comprised of a simple two-input NAND gate having an enable signal input and a source clock input. The enable signal relay means of this embodiment, shown in the box marked A, functions to delay the delivery of the rising edge of a secondary enablement signal CE0 to the enable signal input of the signal joining means until such time as the state of the source clock signal CLK being received at the source clock input of the signal joining means is low.

The enable signal relay means of the instant embodiment consists of a first C-element which receives a source clock signal CLK at a first input and an enable signal CEj at a second input, and which produces an intermediate enable signal CEx. A second C-element receives the intermediate enable signal CEx at a first input, and an inverted source clock signal $\overline{CLK}$ at a second input, and produces a secondary enable signal CE0. The output CE0 of the second C-element is provided to the enable signal input of the signal joining means.

It is assumed that the outputs of each C-element are initialized to 0. When CEj and CLK are both in a high state, the intermediate enable signal CEx goes high. Subsequently, the secondary enable signal CE0 of the second C-element will go high with the next rising edge of the inverted source clock signal $\overline{CLK}$. Assuming that the aggregate propagation delays of the inverter and second C-element are greater than the propagation delay of the source clock line, the rising edge of the secondary enablement signal CE0 will only be provided to the signal joining means during the low phase of the source clock signal CLK. Initial pulse truncations resulting from the arrival time of CEj are thereby avoided.

When the falling edge of CEj is subsequently received at the input of the enable signal relay means, the intermediate enable signal CEx of the first C-element will go low if the state of the source clock signal CLK is low, or, if the state of the source clock signal CLK is high, with the next falling edge of CLK. Subsequently, the secondary enable signal CE0 of the second C-element will go low with the next falling edge of $\overline{CLK}$.

Figure 6A:
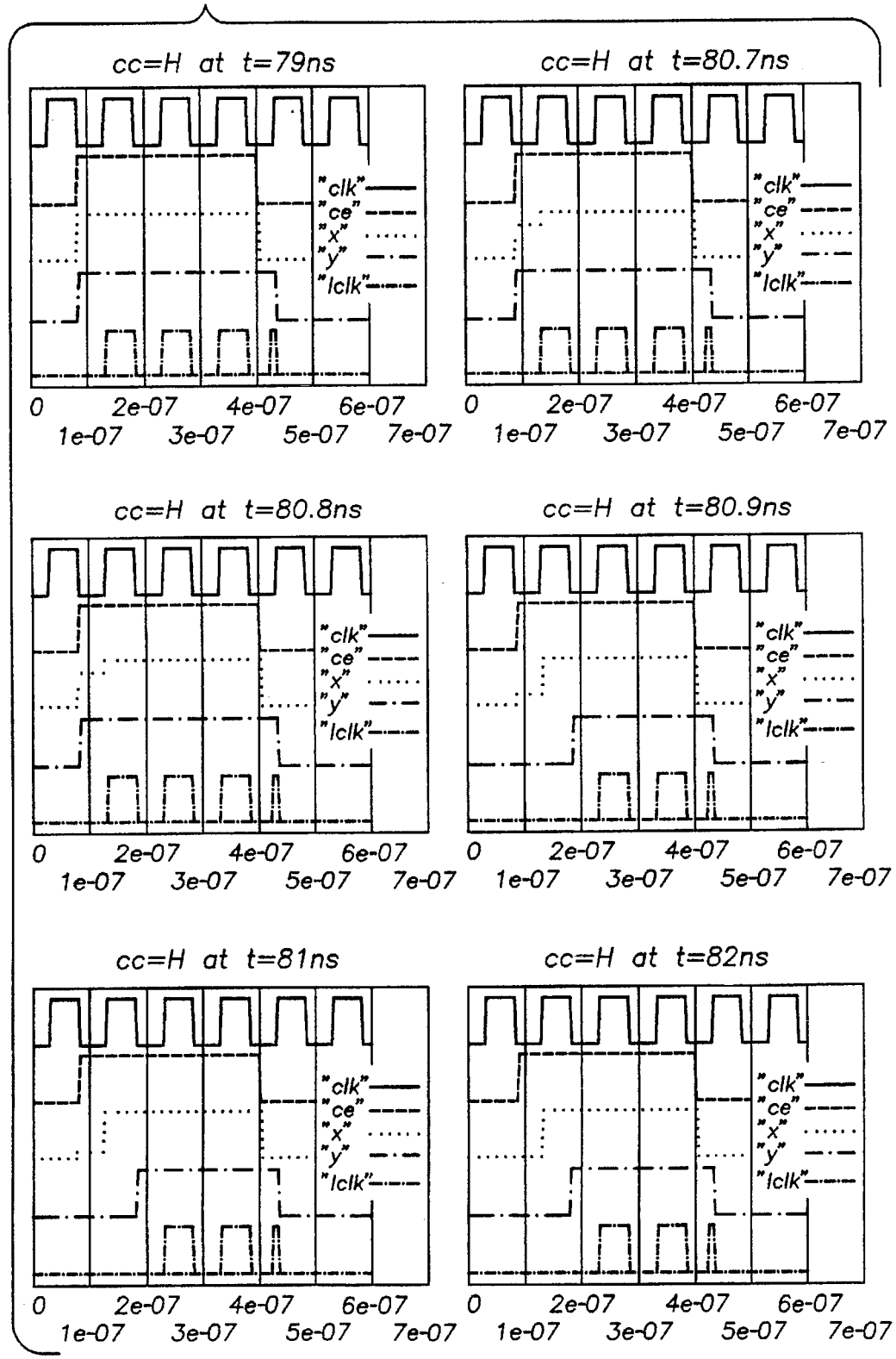
FIG. 6a: Results of a SPICE simulation of the enablement case of the embodiment of FIG. 6.

In this embodiment, delays internal to the local clock control circuit may delay the falling edge of the secondary enable signal CE0 such that a final truncated LCLK pulse is issued. This case is illustrated by the letter B in the timing diagram of FIG. 6. Similarly, the rising edge of the secondary enable signal CE0 may be delayed such that the beginning of the local clock signal LCLK is delayed by one clock cycle. SPICE simulation results for the enabling case, using a clock with a period of 100 ns and a falling period of 2 ns, are provided in FIG. 6a.

The minimum source clock period for this embodiment is the larger of the minimum clock period $T_{min1}$ of the clock control circuit and the minimum clock period $T_{min2}$ of the controlled block. These are given by:

$$T_{min1} >= 2 \times [2 \times T_d(C) + T_d(\text{and})]$$

and $$T_{min2} >= T_d(\text{logic}) + T_{skew}(\text{internal})$$

where $T_d$(logic) is the sum of the gate delays internal to the controlled block and $T_{skew}$(internal) is the maximum local skew inside the controlled block. Typically, the delay associated with the controlled block, rather than the delays of the local clock control circuit, is determinative of the minimum source clock period.

Figure 7:
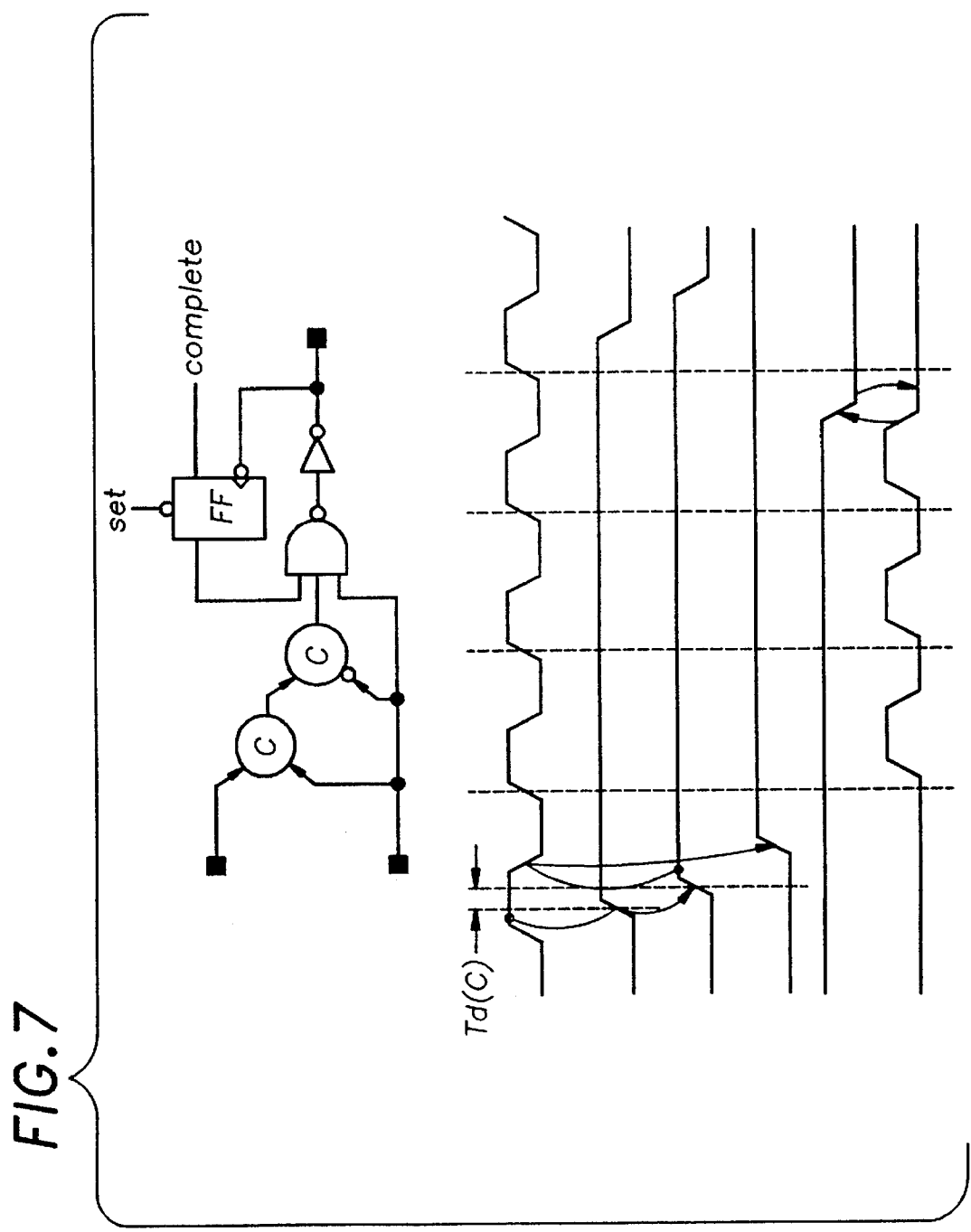
FIG. 7: The logic of the fourth alternative local clock control circuit embodying the invention in combination with a controlled block having internal logic for disabling the local clock signal, and its timing diagram.
Figure 8:
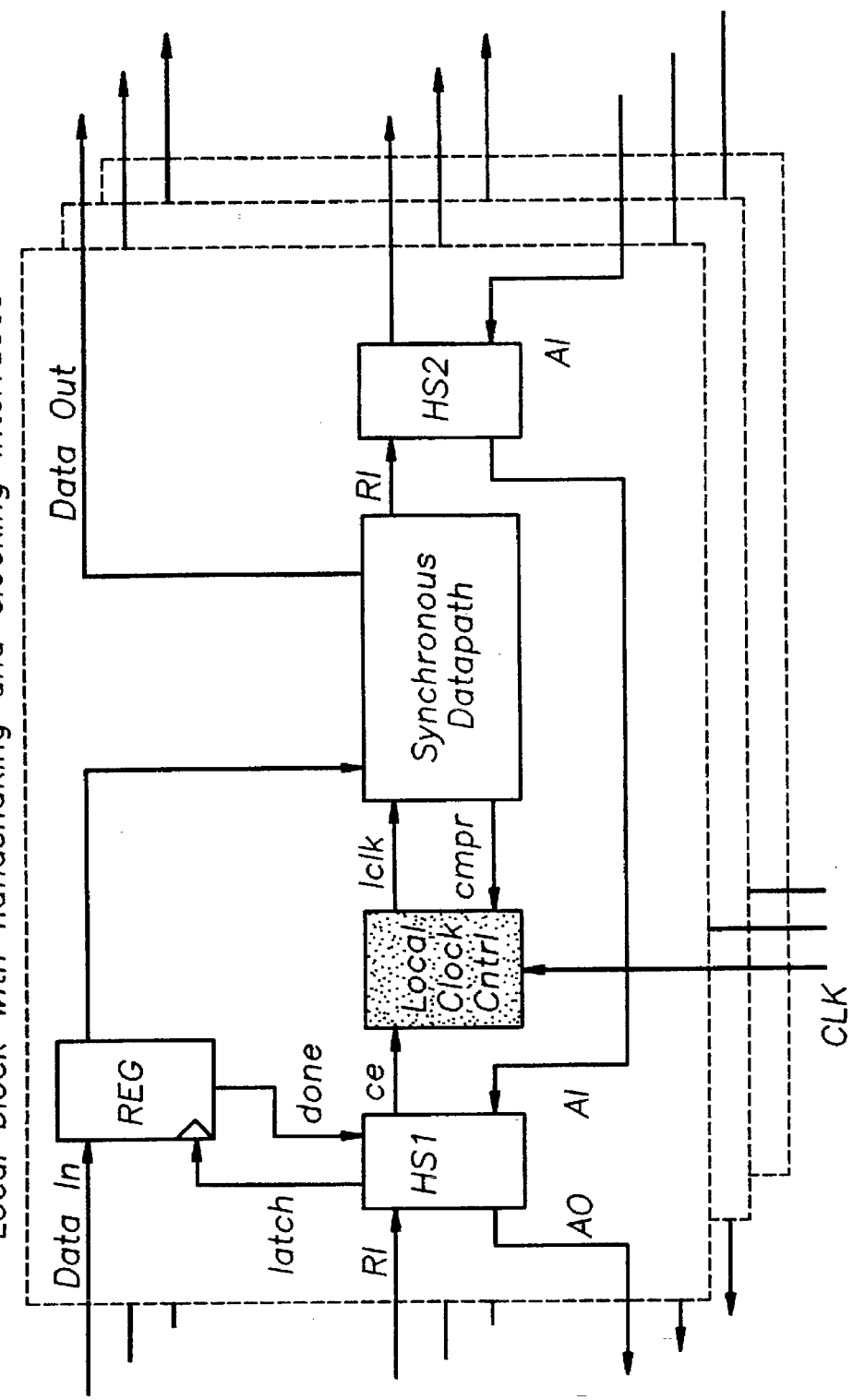
FIG. 8: A local clock control circuit embodying the invention within a block of a locally clocked synchronous datapath system which utilizes local disabling of the local clock signal.

The possibility of a truncated final local clock pulse may make this embodiment unsuitable for applications in which the controlling block determines the disabling of the controlled block. However, this embodiment is suitable, and may be preferred for its economy of size, for applications in which disabling of the controlled block is determined by logic internal to the controlled block. FIG. 7 illustrates the embodiment of FIG. 6 with modifications making it suitable for use with a controlled block having internal logic for disabling the local clock signal. A three-input NAND gate is substituted for the two-input NAND gate of FIG. 6. The third input of this NAND gate receives a disable signal CMPR from a controlled block FF. When the state of the disable signal CMPR goes low, the NAND gate operates to terminate further generation of the local clock signal LCLK by the local clock control circuit. FIG. 8 provides an illustration of an example of an application of the embodiment of FIG. 7, wherein the local clock control circuit serves to provide a local clock signal LCLK to a synchronous datapath in a self-timed environment.

VI Fifth alternative embodiment

Figure 9:
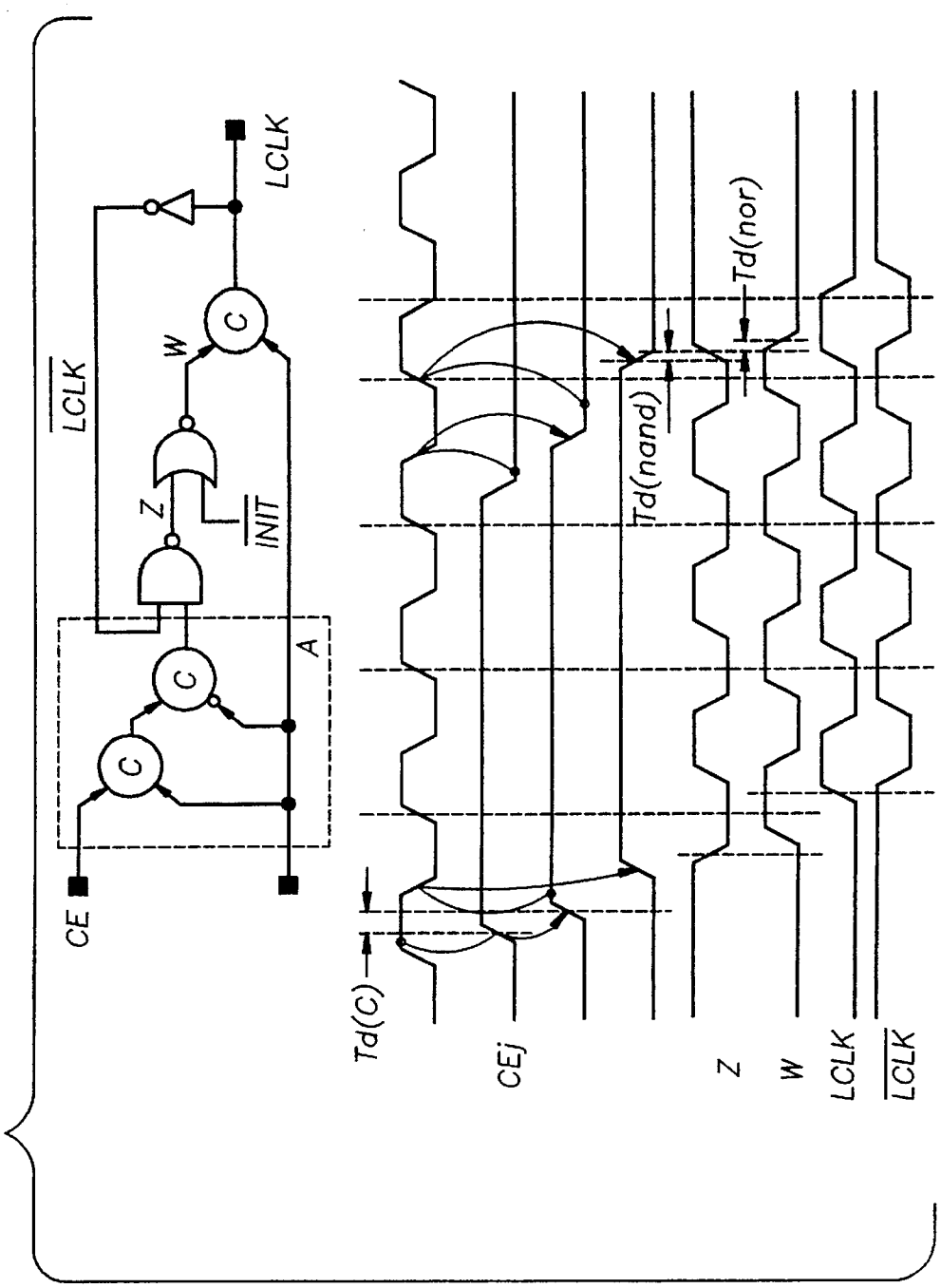
FIG. 9: The logic of a fifth alternative local clock control circuit embodying the invention, and its timing diagram.
Figure 9A:
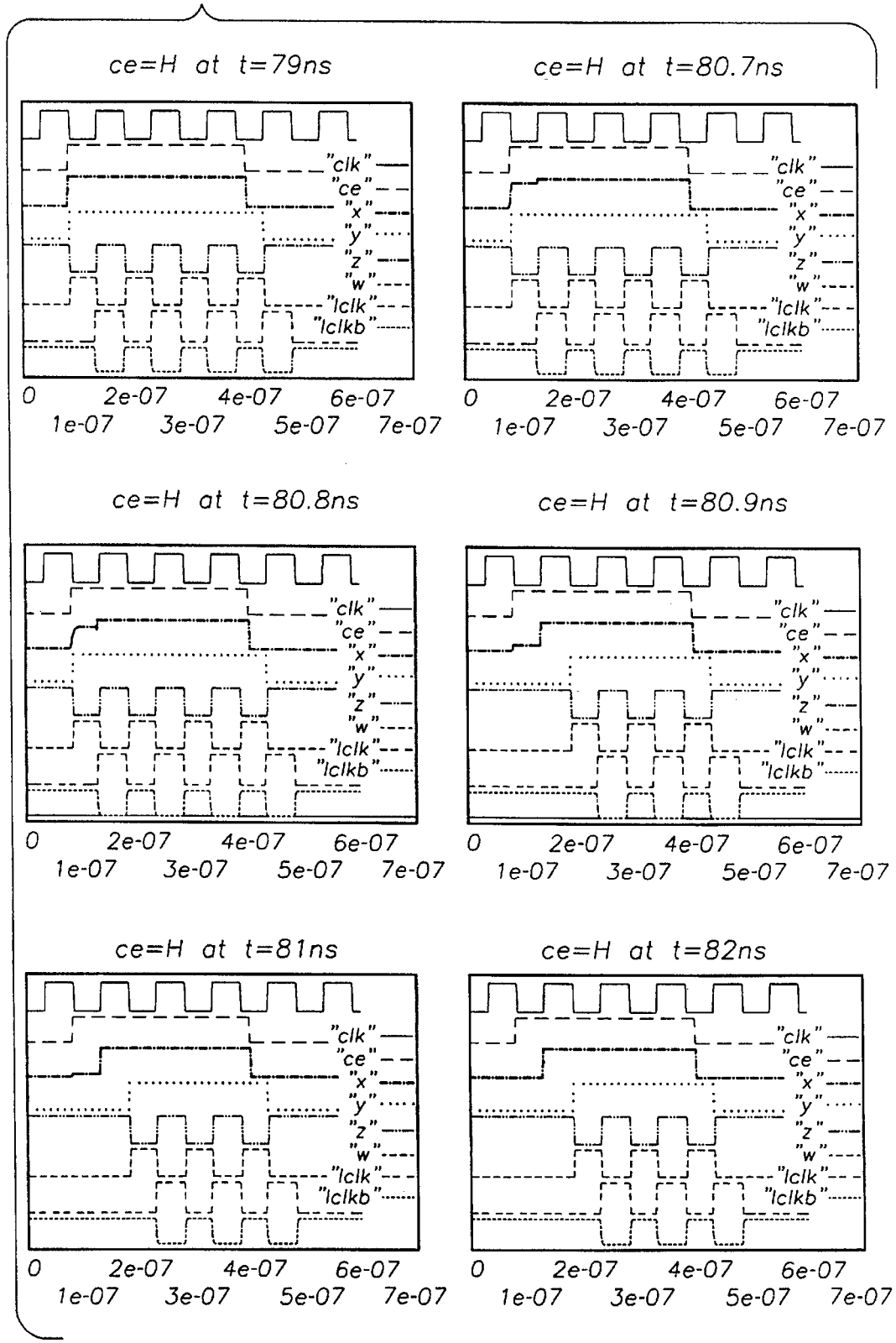
FIG. 9a: Results of a SPICE simulation of the enablement case of the embodiment of FIG. 9.
Figure 9B:
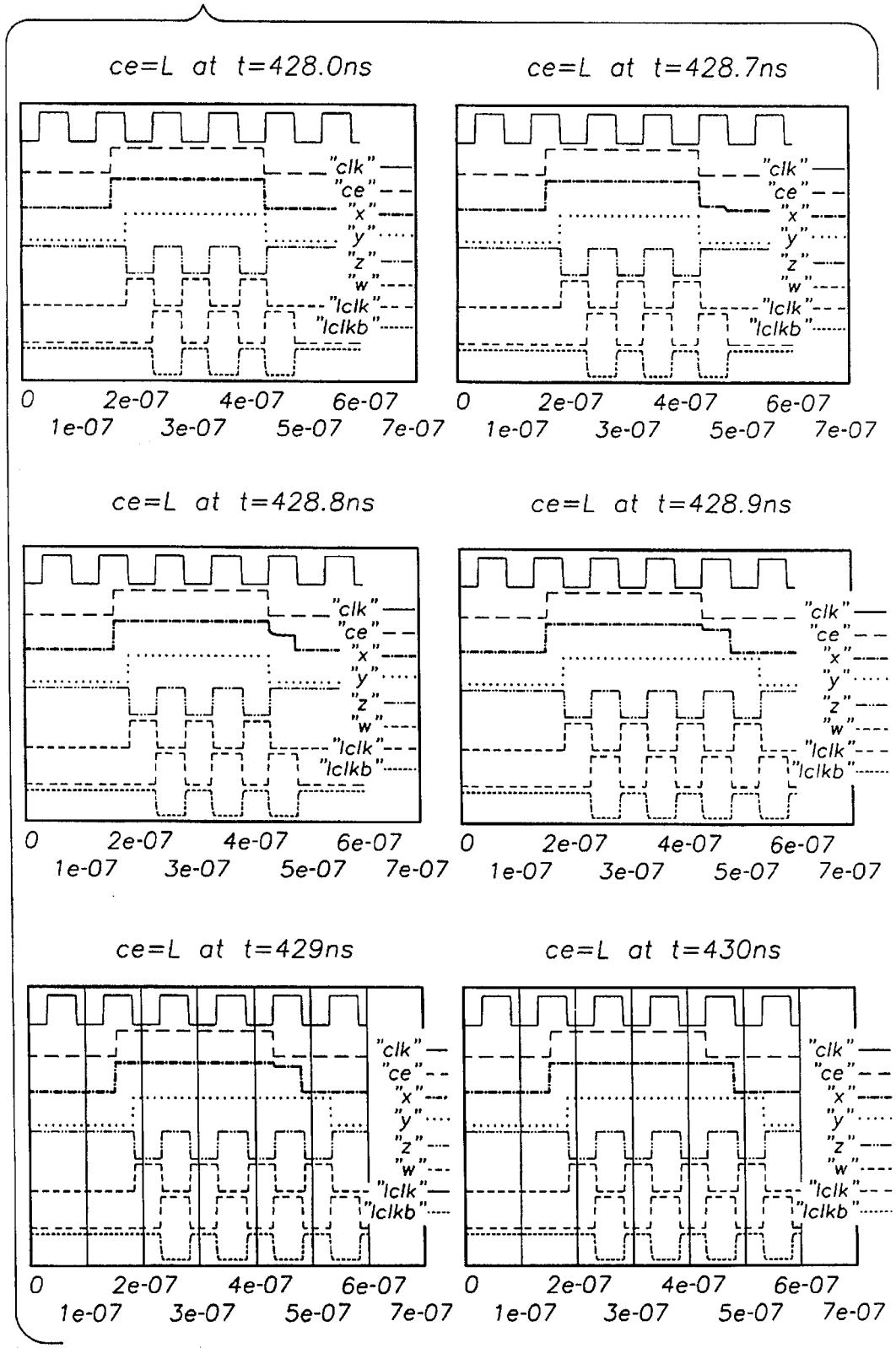
FIG. 9b: Results of a SPICE simulation of the disablement case of the embodiment of FIG. 9.

FIG. 9 illustrates a fifth alternative local clock control circuit which combines an enable signal relay means as illustrated in FIGS. 6 and 7 with a signal joining means as illustrated in FIG. 3. The substitution of the signal joining means of FIG. 3 for the NAND gate of FIG. 6 ensures that the final pulse of the local clock signal will terminate with the falling edge of its corresponding source clock pulse, thereby avoiding the final pulse truncation problem of the embodiment of FIG. 6. This circuit is therefore preferred for applications in which a controlling block is used to control both the initiation and termination of LCLK. As with the embodiment of FIGS. 6 and 7, the arrival time of CEj may delay the production of the local clock signal LCLK by one clock cycle. SPICE simulation results, using a clock with a period of 100 ns and a falling period of 2 ns, are provided in FIGS. 9a and 9b for the enabling and disabling cases, respectively.

The minimum source clock period for this embodiment is the larger of the minimum clock period $T_{min1}$ of the clock control circuit and the minimum clock period $T_{min2}$ of the controlled block. These are given by:

$$T_{min1} >= 2 \times [3 \times T_d(C) + T_d(\text{nand}) + T_d(\text{nor})]$$

and $$T_{min2} >= T_d(\text{logic}) + T_{skew}(\text{internal})$$

where $T_d$(logic) is the sum of the gate delays internal to the controlled block and $T_{skew}$(internal) is the maximum local skew inside the controlled block. Typically, the delay associated with the controlled block, rather than the delays of the local clock control circuit, is determinative of the minimum source clock period.

We claim:

1. A local clock control circuit for providing a local clock signal to a controlled block of a digital circuit, comprising:

an enable signal relay for providing a secondary enable signal in response to detection of an enable signal, said enable signal relay having a first input for receiving an enable signal, a second input for receiving a source clock signal, and an output for providing said secondary enable signal; and a signal joiner for providing a local clock signal in response to said secondary enable signal, said signal joiner having a first input for receiving said secondary enable signal, a second input for receiving said source clock signal, and an output for providing said local clock signal;

said enable signal relay comprising:

an inverter having an input for receiving said source clock signal and an output for providing an inverted source clock signal; and a Muller C-element having a first input for receiving said enable signal, a second input for receiving said inverted source clock signal, and an output for providing said secondary enable signal to said signal joiner.

2. The apparatus of claim 1, wherein said signal joiner comprises:

a Muller C-element, having a first input, a second input for receiving said source clock signal, and an output for providing said local clock signal;

a local clock signal inverter having an input for receiving said local clock signal, and an output for providing an inverted local clock signal; and, an AND gate having a first input for receiving said secondary enable signal, a second input for receiving said inverted local clock signal, and an output for providing an output signal to said first input of said Muller C-element of said signal joiner.

3. A local clock control circuit for providing a local clock signal for a controlled block of a digital circuit, comprising:

an enable signal relay for providing a secondary enable signal in response to detection of an enable signal, said enable signal relay having a first input for receiving an enable signal, a second input for receiving a source clock signal, and an output for providing said secondary enable signal; and, a signal joiner for providing a local clock signal in response to said secondary enable signal, said signal joiner having a first input for receiving said secondary enable signal, a second input for receiving said source clock signal, and an output for providing said local clock signal;

said enable signal relay comprising:

a Muller C-element having a first input for receiving said enable signal, a second input for receiving said source clock signal, and an output for providing said secondary enable signal to said signal joiner; and, source clock signal delay means having an input for receiving said source clock signal and an output for providing a source clock signal which is delayed by approximately one half-cycle to said signal joiner.

4. The apparatus of claim 3, wherein said source clock signal delay means is an inverter.

5. The apparatus of claim 3, wherein said signal joiner comprises:

a Muller C-element having a first input, a second input for receiving said delayed source clock signal, and an output for providing said local clock signal;

a local clock signal inverter having an input for receiving said local clock signal, and an output for providing an inverted local clock signal; and, an AND gate having a first input for receiving said secondary enable signal, a second input for receiving said inverted local clock signal, and an output for providing an output signal to said first input of said Muller C-element of said signal joining means.

6. A local clock control circuit for providing a local clock signal for a controlled block of a digital circuit, comprising:

an enable signal relay for providing a secondary enable signal in response to detection of an enable signal, said enable signal relay having a first input for receiving an enable signal, a second input for receiving a source clock signal, and an output for providing said secondary enable signal; and, a signal joiner for providing a local clock signal in response to said secondary enable signal, said signal joiner having a first input for receiving said secondary enable signal, a second input for receiving said source clock signal, and an output for providing said local clock signal;

said enable signal relay comprising:

a first Muller C-element having a first input for receiving said enable signal, a second input for receiving said source clock signal, and an output, for providing an intermediate enable signal representative of said enable condition;

a source clock inverter having an input for receiving said source clock signal and an output for providing an inverted source clock signal; and, a second Muller C-element having a first input for receiving said intermediate enable signal, a second input for receiving said inverted clock signal from said inverter, and an output for providing said secondary enable signal.

7. The apparatus of claim 6, wherein said signal joiner comprises:

an AND gate having a first input for receiving said secondary enable signal, a second input for receiving said source clock signal, and an output for providing said local clock signal.

8. The apparatus of claim 7, wherein said signal joiner is further comprised of a third input for receiving from said controlled block a disable signal representative of a disable condition.

9. The apparatus of claim 6, wherein said signal joiner comprises means for disabling said local clock signal in response to a disable signal provided by said controlled block.

10. The apparatus of claim 6, wherein said signal joiner comprises:

a Muller C-element, having a first input, a second input for receiving said source clock signal, and an output for providing said local clock signal;

a local clock signal inverter, having an input for receiving said local clock signal, and an output for providing an inverted local clock signal; and, an AND gate, having a first input for receiving said secondary enable signal, a second input for receiving said inverted local clock signal, and an output for providing an output signal to said first input of said Muller C-element of said signal joining means.

11. A local clock control circuit for providing a local clock signal to a controlled block of a digital circuit, said local clock control circuit comprising a signal joiner, said signal joiner comprising:

a Muller C-element having a first input, a second input for receiving a source clock signal, and an output for providing said local clock signal to said controlled block;

a local clock circuit inverter, having an input for receiving said local clock signal, and an output for providing an inverted local clock signal; and, an AND gate, having a first input for receiving a signal representative of an enable condition, a second input for receiving said inverted local clock signal, and an output for providing an output signal to said first input of said Muller C-element.

12. An enable signal relay means for detecting an enable signal representative of an enable condition and for providing a secondary enable signal representative of said enable condition, comprising:

a first Muller C-element having a first input for receiving said enable signal, a second input for receiving a source clock signal, and an output, for providing an intermediate enable signal representative of said enable condition;

a source clock inverter having an input for receiving said source clock signal and an output for providing an inverted source clock signal; and, a second Muller C-element having a first input for receiving said intermediate enable signal, a second input for receiving said inverted clock signal from said inverter, and an output for providing said secondary enable signal.

13. A method for providing a signal representative of an enable condition to a signal joiner of a local clock control circuit, comprising:

detecting from the state of an enable signal an enable condition;

detecting a state of said source clock signal which is the same as the state of a signal which would be representative to said signal joining means of an enable condition;

detecting a first transition in the state of said source clock signal; and prior to detecting a second transition in state of said source clock signal, providing said secondary enable signal to said signal joining means in response to said detection of said enable condition and said first transition.

14. A method for selectively providing a clock signal to a controlled block of a digital circuit, comprising:

detecting, from the state of an enable signal, an enable condition;

detecting a transition in said clock signal to a state which is opposite of a state of said enable signal which is representative of said enable condition; and providing the next whole pulse of said clock signal to said controlled block.

15. The method of claim 14, further comprising:

detecting, from the state of said enable signal, a disable condition; and, terminating, in response to the detection of said disable condition, said providing of said clock signal to said controlled block.

16. The method of claim 14, further comprising:

detecting, from the state of a disable signal produced by said controlled block, a disable condition; and, terminating, in response to the detection of said disable condition, said providing of said clock signal to said controlled block.

17. A system for selectively providing a clock signal to a controlled block of a digital circuit, comprising:

means for detecting an enable condition from the state of an enable signal;

means for detecting a transition of said clock signal to a state which is opposite of a state of said enable signal which is representative of said enable condition; and means for providing the next whole pulse of said clock signal to said controlled block.

18. The system of claim 17, further comprising:

means for detecting a disable condition from the state of said enable signal; and, means for terminating said providing of said clock signal to said controlled block in response to the detection of said disable condition.

19. The system of claim 18, wherein said means for terminating operates to terminate said clock signal such that the final pulse of said clock signal is a whole pulse.

20. The system of claim 17, further comprising:

means for detecting a disable condition from the state of a disable signal produced by said controlled block; and, means for terminating said providing of said clock signal to said controlled block in response to the detection of said disable condition.

\* \* \* \* \*